2,778,803

MAGNETICALLY HARD MATERIALS

Henry L. Crowley, South Orange, N. J., assignor, by mesne assignments, to Aerovox Corporation, New Bedford, Mass., a corporation of Massachusetts No Drawing. Application February 6, 1953, Serial No. 335,596

6 Claims. (Cl. 252—62.5)

This invention relates to magnetic materials and especially to magnetically hard materials suitable for permanent magnets, and has for its object the provision of an improved permanent magnet material and method of making the same.

Magnetic compositions composed largely of ferromagnetic oxides, commonly known as ferrites, are presently well known and find extensive use in the electronic and related arts because of their high magnetic permeability and high electric resistivity. These compositions are magnetically soft, that is they are easily demagnetized. There is also presently known another class of magnetic compositions of the ferromagnetic oxide type containing oxide of cobalt or oxide of nickel, or both, which are magnetically hard and can be permanently magnetized. The present day cost and scarcity of cobalt and nickel have prompted research for other ferromagnetic oxides suitable for permanent magnets, and it has been found that the heat-treated mixture of ferric oxide and barium oxide is magnetically hard. The present invention is directed to a ferromagnetic oxide of the latter type and involves certain improvements therein.

The present invention is based on the discovery that the inclusion of lead oxide (PbO) in the heat-treated mixture of ferric oxide ($Fe_2O_3$) and barium oxide (BaO) imparts thereto surprising and unexpected improved hard magnetic properties. In particular, remanent magnetization and coercive force are markedly increased by such inclusion of lead oxide. The improved magnetically hard material of the invention comprises a heat-treated mixture of ferric oxide, barium oxide and lead oxide. The amount of lead oxide included in the mixture may vary from about 1 to 10% by weight, 2% by weight giving very satisfactory results. The relative proportions of ferric oxide and barium oxide may vary from about 2 to 5 parts by weight of ferric oxide to 1 part by weight of barium oxide.

The magnetically hard material of the invention is prepared by intimately mixing ferric, barium and lead oxides. Since barium carbonate ($BaCO_3$) is commercially more available than barium oxide, it is generally preferable to include the carbonate rather than the oxide in the initial oxide mixture. Commercial forms and grades of ferric oxide, barium carbonate and lead oxide are suitable. These compounds are commercially available in powdered form, of a particle size suitable for use as paint pigments, and in such form require no grinding or other conditioning treatment for the purposes of the invention.

In preparing the initial oxide mixture, the relative proportions by weight of ferric oxide and barium carbonate may vary within comparatively wide limits, with the ferric oxide in excess and generally in the ratio of 2 to 4 parts by weight of ferric oxide to 1 part by weight of barium carbonate. Usually, about 2% of lead oxide gives very satisfactory results, but the amount is not critical and may vary from about 1 to 10% by weight on the basis of the total initial oxide mixture. The following initial oxide mixtures indicate, merely by way of example, suitable proportioning of the oxidic components:

| | I | II | III | IV | V | VI |
|---|---|---|---|---|---|---|
| | *Percent* | *Percent* | *Percent* | *Percent* | *Percent* | *Percent* |
| PbO | 1 | 2 | 10 | 5 | 4 | 8 |
| $BaCO_3$ | 19 | 18 | 30 | 25 | 21 | 27 |
| $Fe_2O_3$ | 80 | 80 | 60 | 70 | 75 | 65 |

The initial oxide mixture is thoroughly mixed to produce a homogeneous dispersion of the metal oxides so that the subsequent reactions during heat-treatment take place uniformly throughout the entire mass of the mixture. Ordinarily, the mixture is pressed into shaped articles of the desired size and configuration of the permanent magnets for which it is being processed. A suitable binder is preferably incorporated in the mixture for imparting plasticity and lubrication thereto, such as a mixture of a wax-like material, like stearic acid, and a resinous material, such as a phenol formaldehyde resin, with sufficient water to give the necessary plasticity for pressing. The mixture, with incorporated binder, is pressed into shaped articles, e. g. ring, bar or U-shaped magnet, under a pressure of approximately 20,000 pounds per square inch. The shaped articles are then dried at a temperature slightly in excess of 100° C. to eliminate moisture.

The dried shaped articles are heat-treated in any suitable type of kiln or furnace at a temperature within the range of 1100 and 1300° C., and usually at about 1200° C. Heating to the ultimate high temperature is preferably slow and gradual, preferably at the rate of from 25 to 30° C. per hour, and in any case over a period of at least 24 hours. The shaped articles are held at the ultimate high temperature for several hours, 4 hours being usually adequate. From the ultimate high temperature, the shaped articles are gradually cooled to room temperature in a period of 8 to 12 hours. In practice, it is sometimes convenient to interrupt the supply of heat to the furnace or kiln at the completion of heat-treatment, and permit the shaped articles to cool down within the kiln or furnace. Heating may conveniently be carried out by passing the products of combustion of a controlled mixture of fuel gas (or other suitable combustible fuel) and air directly in contact with the shaped articles. The ambient atmosphere in which the shaped articles are heat-treated does not appear to have any significant effect on the final product.

The heat-treated and cooled shaped articles are non-magnetic, that is they display no magnetic properties. But when subjected to a strong magnetic field they display a remarkably high magnetic anisotropic property. For example, when subjected to a magnetic field of about 6000 oersteds they possess a very high degree of remanent magnetization and a coercive force of at least 3000 oersteds. This remanent magnetization is practically permanent, and as far as now determined is unimpaired by the usual applications of permanent magnets in electronic apparatus. As contrasted with permanent magnets similarly made from an initial oxide mixture of substantially the same composition but containing no lead oxide, the magnetically hard material of the invention is 10 to 25% superior as determined by its resistance to demagnetization, i. e., its coercive force.

I claim:

1. The method of preparing a magnetically hard material which comprises forming under pressure into shaped articles an oxide mixture consisting essentially of ferric oxide, barium carbonate and lead oxide in which the relative proportions by weight of ferric oxide and barium carbonate respectively are 2 to 4 parts to 1 part, and in which the amount by weight of lead oxide is 1 to 10%, gradually heating the shaped articles over a period of at least 24 hours to 1100–1300° C., holding the shaped articles at a temperature within the range of 1100–1300° C. for several hours, and gradually cooling the shaped articles to room temperature.

2. The method according to claim 1 in which the oxide mixture consisting essentially of about 80% by weight of ferric oxide, about 18% by weight of barium carbonate and about 2% by weight of lead oxide.

3. The method of claim 2 in which the shaped articles are heated over said period to a temperature of about 1200° C.

4. The method of preparing a magnetically hard material which comprises forming under pressure into shaped articles an oxide mixture consisting essentially of ferric oxide, barium carbonate and lead oxide in which the relative proportions by weight of ferric oxide and barium carbonate respectively are 2 to 4 parts to 1 part, and in which the amount by weight of lead oxide is 1 to 10%, gradually heating the shaped articles over a period of at least 24 hours to 1100–1300° C., holding the shaped articles at a temperature within the range of 1100–1300° C. for several hours, and gradually cooling the shaped articles over a period of at least 8 hours.

5. A product produced by the method of claim 1.

6. A product produced by the method of claim 2.

References Cited in the file of this patent

UNITED STATES PATENTS 2,698,917 Van Urk et al. ............ Jan. 4, 1955

FOREIGN PATENTS 504,686 Belgium ................ Jan. 16, 1952

OTHER REFERENCES

Elect. Eng., vol. 77 (1952), pp. 644–7.

Proceedings of the Inst. of Electrical Eng., part II, No. 56, vol. 97, p. 250.

Philips Technical Review, vol. 13, N. 7, January 1952, p. 205.

Physical Review, vol. 86 (1952), pp. 424–425 pertinent.